(12) United States Patent
Lindstrom et al.

(10) Patent No.: US 11,217,857 B2
(45) Date of Patent: Jan. 4, 2022

(54) METHOD AND APPARATUS FOR MANAGING THERMAL RUNAWAY GASES IN A BATTERY SYSTEM

(71) Applicant: CORVUS ENERGY INC., Richmond (CA)

(72) Inventors: Jeremy Lindstrom, Richmond (CA); David Lokhorst, Richmond (CA)

(73) Assignee: CORVUS ENERGY INC., Richmond (CA)

( * ) Notice: Subject to any disclaimer, the term of this patent is extended or adjusted under 35 U.S.C. 154(b) by 130 days.

(21) Appl. No.: 16/095,266

(22) PCT Filed: Apr. 20, 2017

(86) PCT No.: PCT/CA2017/050490
§ 371 (c)(1),
(2) Date: Oct. 19, 2018

(87) PCT Pub. No.: WO2017/181283
PCT Pub. Date: Oct. 26, 2017

(65) Prior Publication Data
US 2019/0140235 A1 May 9, 2019

Related U.S. Application Data

(60) Provisional application No. 62/325,337, filed on Apr. 20, 2016.

(51) Int. Cl.
*H01M 50/30* (2021.01)
*H01M 10/6566* (2014.01)
(Continued)

(52) U.S. Cl.
CPC ......... *H01M 50/30* (2021.01); *H01M 10/613* (2015.04); *H01M 10/6566* (2015.04); *H01M 50/20* (2021.01); *H01M 50/204* (2021.01)

(58) Field of Classification Search
CPC ................ H01M 2/1211–1217; H01M 2/1077
See application file for complete search history.

(56) References Cited

U.S. PATENT DOCUMENTS 4,751,154 A * 6/1988 Binder .................. H01M 10/52
429/53
7,351,493 B2 4/2008 Uemoto et al.
(Continued)

FOREIGN PATENT DOCUMENTS

CN      1659739 A     8/2005
CN    102197531 A     9/2011
(Continued)

OTHER PUBLICATIONS

International Search Report and Written Opinion in related International Application No. PCT/CA2017/050490 dated Jul. 31, 2017.
(Continued)

*Primary Examiner* — Maria Laios
(74) *Attorney, Agent, or Firm* — Venable LLP; Michele V. Frank (57) ABSTRACT

A system comprising one or more battery modules mounted in a rack assembly has a structure which defines a cooling air pathway for flowing cooling air across the side and/or bottom of each battery module thereby cooling the battery module, or alternatively, across the energy calls in the battery module. Further, the system has a structure which defines a thermal runaway gas pathway for flowing thermal runaway gases from a battery module out of the system. The system structure is configured to ensure that the cooling air pathway and thermal runaway gas pathway are physically separated, thereby minimizing the risk of the thermal runaway gas substantially mixing with cooling air thereby potentially resulting in a spontaneous ignition and an explosion.

11 Claims, 7 Drawing Sheets

(51) Int. Cl.
_H01M 10/613_ (2014.01)
_H01M 50/20_ (2021.01)
_H01M 50/204_ (2021.01)

(56) References Cited

U.S. PATENT DOCUMENTS

| | | | |
|---|---|---|---|
| 7,410,722 B2 * | 8/2008 | Iwamura | H01M 2/0245 |
| | | | 429/100 |
| 8,642,204 B2 | 2/2014 | Higashino et al. | |
| 2005/0170239 A1 | 8/2005 | Uemoto et al. | |
| 2011/0200856 A1 | 8/2011 | Yasui et al. | |
| 2013/0143083 A1 | 6/2013 | Utley et al. | |
| 2015/0367747 A1 * | 12/2015 | Decker | B60L 58/16 |
| | | | 320/136 |

FOREIGN PATENT DOCUMENTS

| | | |
|---|---|---|
| CN | 103348505 A | 10/2013 |
| CN | 104813506 A | 7/2015 |
| EP | 1462813 A2 | 9/2004 |
| EP | 1462813 A3 | 8/2005 |
| EP | 2453502 A1 | 5/2012 |
| EP | 2929579 A1 | 10/2015 |
| JP | H10255735 A | 9/1998 |
| JP | 2002151025 A | 5/2002 |
| JP | 2010192209 A | 9/2010 |
| JP | 2011171052 A | 9/2011 |
| JP | 2012227120 A | 11/2012 |
| JP | 2015-115285 A | 6/2015 |
| WO | 2012/062897 A1 | 5/2012 |
| WO | 2014/087234 A1 | 6/2014 |
| WO | WO-2014087234 A1 * | 6/2014 ............. H01M 2/12 |

OTHER PUBLICATIONS

Extended European Search Report issued in related European Patent Application No. 17785205.0 dated Dec. 2, 2019.

* cited by examiner

METHOD AND APPARATUS FOR MANAGING THERMAL RUNAWAY GASES IN A BATTERY SYSTEM

CROSS REFERENCE TO RELATED APPLICATIONS

The present application is a National Stage Entry of PCT/CA2017/050490, filed Apr. 20, 2017, which claims priority to Provisional Application No. 62/325,337, filed Apr. 20, 2016, both of which are hereby incorporated by reference in their entireties.

FIELD

The present disclosure relates generally to a method and apparatus for managing thermal runaway gases in a battery system, including separating thermal runaway gases from cooling air in the battery system.

BACKGROUND

One type of rechargeable battery is a lithium-ion battery having a multiple-layered structure comprising a positive electrode activated by various mixed oxides or olivines, a negative electrode activated by special carbon, and a separator all immersed in an organic electrolyte. The battery is typically housed in an enclosure to form a battery module. During normal operating conditions, electrical energy is converted to and stored as chemical energy during charging, and stored chemical energy is converted to electrical energy during discharging. More particularly, during charging, lithium in the positive electrode is ionized and moves from layer to layer to the negative electrode; during discharging, the ions move to the positive electrode and return to its original compound. Multiple lithium ion battery modules can be mounted on a rack assembly to form a battery pack.

In certain extreme circumstances such as an over-voltage, over-current or over-temperature, a condition known as "self heating" can occur within a lithium ion battery, which can cause the battery to enter a state known as "thermal runaway". Self-heating is a condition wherein the internal electro-chemical structure of a battery cell causes the temperature therein to increase. Thermal runaway occurs when the internal temperature in the battery cell increases to a level wherein a chemical reaction occurs and flammable gases are released. If there is sufficient oxygen within the enclosure that houses the battery cell, the flammable gases will ignite and release a significant amount of energy.

The effects of thermal runaway in a single battery module can be quite dramatic and damaging. When a thermal runaway occurs, small amounts of oxygen are generated and the internal temperature may rise to greater than 800° C. The combination of these events can lead to an internal fire, excessive gassing and, subsequently, a breakdown of the enclosure surrounding the lithium ion cells. The fire rapidly consumes the internally generated oxygen and continues to consume oxygen surrounding the cells.

Excessive gases that are generated within the battery module can cause the internal pressure to increase beyond a safe limit, and may lead to a destructive event such as a rupture in the enclosure. Therefore, it is known to provide the enclosure with pressure relief or venting means to allow the excessive gases to leave the module. However, when these gases mix with surrounding air, and the resulting mixture is in between the lower and upper flammability limits, the mixture may spontaneously combust, and potentially cause an explosion. This potential problem is exacerbated by certain battery systems which use a blower to flow air over the battery modules to remove heat generated during operation. If thermal runaway occurs in such a system, the excessive gases venting from the battery modules are at a greater risk of mixing with the surrounding air due to the blower contributing to the mixing of the excessive gases with the surrounding air.

It is therefore desirable to provide a solution to at least some of the challenges faced by prior art battery systems.

SUMMARY

According to one aspect of the invention, there is provided a system for managing thermal runaway in a battery, comprising: at least one battery module comprising at least one energy cell; a cooling air pathway in thermal communication with the at least one energy cell; a thermal runaway gas pathway in gaseous communication with the at least one energy cell; and a separator that physically separates the cooling air pathway and the thermal runaway gas pathway such that cooling air flowing along the cooling air pathway does not substantially mix with thermal runaway gas venting from the at least one energy cell and flowing along the thermal runaway gas pathway.

In one specific aspect, the at least one battery module can further comprise a vent port for discharging thermal runaway gas vented from the at least one energy cell. In this specific aspect, the separator can comprise a manifold having a thermal runaway gas channel with a thermal runaway gas inlet in gaseous communication with the vent port such that the thermal runaway gas pathway extends from the vent port, through the thermal runaway gas inlet and into the thermal runaway gas channel. Additionally, the system can comprise a rack assembly comprising the manifold and a frame with at least one shelf for mounting the least one battery module; the cooling air pathway extends between the frame and at least one outer surface of the at least one battery module when the at least one battery module is mounted on the shelf and docked with the rack assembly. Furthermore, the manifold can comprise a cooling air channel with at least one cooling air outlet in gaseous communication with the at least one outer surface of the at least one battery module, such that the cooling air pathway extends through the cooling air channel, through the at least one cooling air outlet and over the at least one surface of the at least one battery module. The system can further comprise a flame arrestor mounted in the thermal runaway gas pathway.

In another specific aspect, the at least one battery module can comprise an enclosure with a cooling air chamber comprising the cooling air pathway and a thermal runaway gas chamber comprising the thermal runaway gas pathway. The separator comprises a separator plate in the battery module which physically separates the cooling air chamber and the thermal runaway gas chamber and which comprises an opening for matingly receiving a top end of the at least one energy cell into the thermal runaway gas chamber such that a gas vent in the energy cell is in gaseous communication with the thermal runaway gas pathway and wherein the rest of the at least one energy cell is located in the cooling air chamber and is in thermal communication with the cooling air pathway. The least one battery module can further comprise a thermal runaway gas vent port in fluid communication with the thermal runaway gas chamber, and the thermal runaway gas pathway extends from the gas vent in the at least one energy cell to the thermal runaway gas vent port. The at least one battery module can further comprise a cooling air inlet and a cooling air outlet both in gaseous communication with the cooling air chamber wherein the cooling air pathway extends from the cooling air inlet to the cooling air outlet.

In yet another specific aspect, the at least one battery module can comprise an enclosure with a base and a lid releasably mounted to an opening in the base, and the system can further comprise a rack assembly in which the at least one battery module is mountable. In this specific aspect, the rack assembly comprises at least one thermal runaway gas chamber having an opening coupled to the opening of the base when the at least one battery module is docked in the rack assembly. The thermal runaway gas pathway extends inside the thermal runaway gas chamber and is physically separated by the thermal runaway gas chamber from the cooling air pathway which is in thermal communication with the base of the at least one battery module. The opening in the base can be at the top of the enclosure and the thermal runaway gas chamber can comprise a lower separator plate having an opening matingly receiving a top end of the base such that the lid is inside the thermal runaway gas chamber; the rest of the base is outside of the thermal runaway gas chamber and at least part of which is in thermal communication with the cooling air pathway. The thermal runaway gas chamber can further comprise a thermal runaway gas outlet at a rear end of the rack assembly, and the rack assembly can further comprise a cooling air outlet, and the cooling air pathway can have an upstream end in fluid communication with the cooling air outlet and a downstream end in fluid communication with an opening at a front end of the rack assembly.

According to another aspect of the invention, there is provided a method for managing thermal runaway in a battery system, comprising: directing cooling air along a cooling air pathway in thermal communication with at least one energy cell in a battery module; and directing a thermal runaway gas formed during a thermal runaway event in the battery module away from the at least one energy cell and along a thermal runaway gas pathway that is physically separated from the cooling air pathway, such that the thermal runaway gas does not substantially mix with the cooling air.

The step of directing cooling air along a cooling air pathway can comprise directing cooling air into a rack assembly housing the battery module and flowing the cooling air across at least one outer surface of the battery module and out of a front end of the rack assembly. The step of directing the thermal runaway gas away from the at least one energy cell can comprise flowing the thermal runaway gas through a thermal runaway gas port in the battery module and through a thermal runaway gas channel in a manifold of the rack assembly.

Alternatively, the step of directing the thermal runaway gas away from the at least one energy cell can comprise separating a lid from a base of the battery module then flowing the thermal runaway gas out of the battery module base into a thermal runaway gas chamber of the rack assembly, wherein at least the battery module lid is located in the thermal runaway gas chamber and at least a part of the battery module base is located outside of the thermal runaway gas chamber and in the cooling air pathway.

Alternatively, the step of directing cooling air along a cooling air pathway can comprise directing cooling air through a cooling air chamber in the battery module, wherein at least part of the at least one energy cell is located in the cooling air chamber. Further, the step of directing the thermal runaway gas away from the at least one energy cell can comprise directing the thermal runaway gas through a thermal runaway gas chamber in the battery module and out of a thermal runaway gas port in the battery module, wherein a part of the at least one energy cell having a gas vent is located in the thermal runaway gas chamber, and the thermal runaway gas chamber and the cooling air chamber are physically separated by a separator plate.

This summary does not necessarily describe the entire scope of all aspects. Other aspects, features and advantages will be apparent to those of ordinary skill in the art upon review of the following description of specific embodiments.

DETAILED DESCRIPTION

Directional terms such as "above", "below", "horizontal" and "vertical" are used to provide relative reference only and to assist the reader in understanding the embodiments described herein, and are not intended to restrict the orientation of any structure or its use relative to the environment.

Embodiments described herein relate generally to a method and apparatus for separating hot flammable gases caused by a thermal runaway event ("thermal runaway gases") in one of more battery modules in a battery system from air that is used to cool the battery modules. The battery modules can house batteries of various types including but not restricted to lithium ion batteries. The embodiments described herein generally comprise a system comprising one or more battery modules mounted in a rack assembly that has a structure which defines a cooling air pathway for flowing cooling air across the side and/or bottom of each battery module thereby cooling the battery module, or alternatively, across the energy calls in the battery module. Further, the system has a structure which defines a thermal runaway gas pathway for flowing thermal runaway gases from a battery module out of the system. The system structure is configured to ensure that the cooling air pathway and thermal runaway gas pathway are physically separated, thereby minimizing the risk of the thermal runaway gas substantially mixing with cooling air such that the resultant mixture has a flammable concentration above the lower flammability limit, thereby potentially resulting in a spontaneous ignition and an explosion.

Referring to FIGS. 1 to 4 and according to a first embodiment, a battery system 10 comprises battery modules 12 that are each provided with a vent port 14 at the rear of the module 12 and are otherwise fluidly sealed, such that any thermal runaway 25 gases formed by a thermal runaway event in the battery module 12 will escape from the battery module via the vent port 14. The battery system 10 also comprises a rack assembly 15 in which the battery modules 12 are mounted. The rack assembly 15 comprises a frame 17 with a manifold 18 having a cooling air channel 19 with an inlet at a base of the frame 17, and cooling air outlets 20 disposed near the rear of each battery module 12. A fan his provided at an inlet end of the cooling air channel 19 to direct cooling air though the cooling air channel 19, through the cooling air outlets 20, over the outer surfaces of the battery modules 12, through the front of rack assembly 15 and out of 5 the system 10 (this air flow pathway is hereby referred to "cooling air pathway 22"). The manifold 18 is also provided with a thermal runaway gas channel 24 with thermal runaway gas inlets 26 that each couple to a respective vent port 14 of a battery module 12, and which direct thermal runaway gases vented from the battery module 12 via its vent ports 14 into the thermal runaway channel 24, through an outlet at the top of the 10 frame 17, and away from the system 10. The thermal runaway gas inlets 26 fluidly couple with the battery module vent ports 14 when the battery module 12 is docked in the rack assembly, and the thermal runaway gas channel 24 defines a thermal runaway gas pathway 29 that is physically separated from the cooling air pathway 22.

Figure 1:
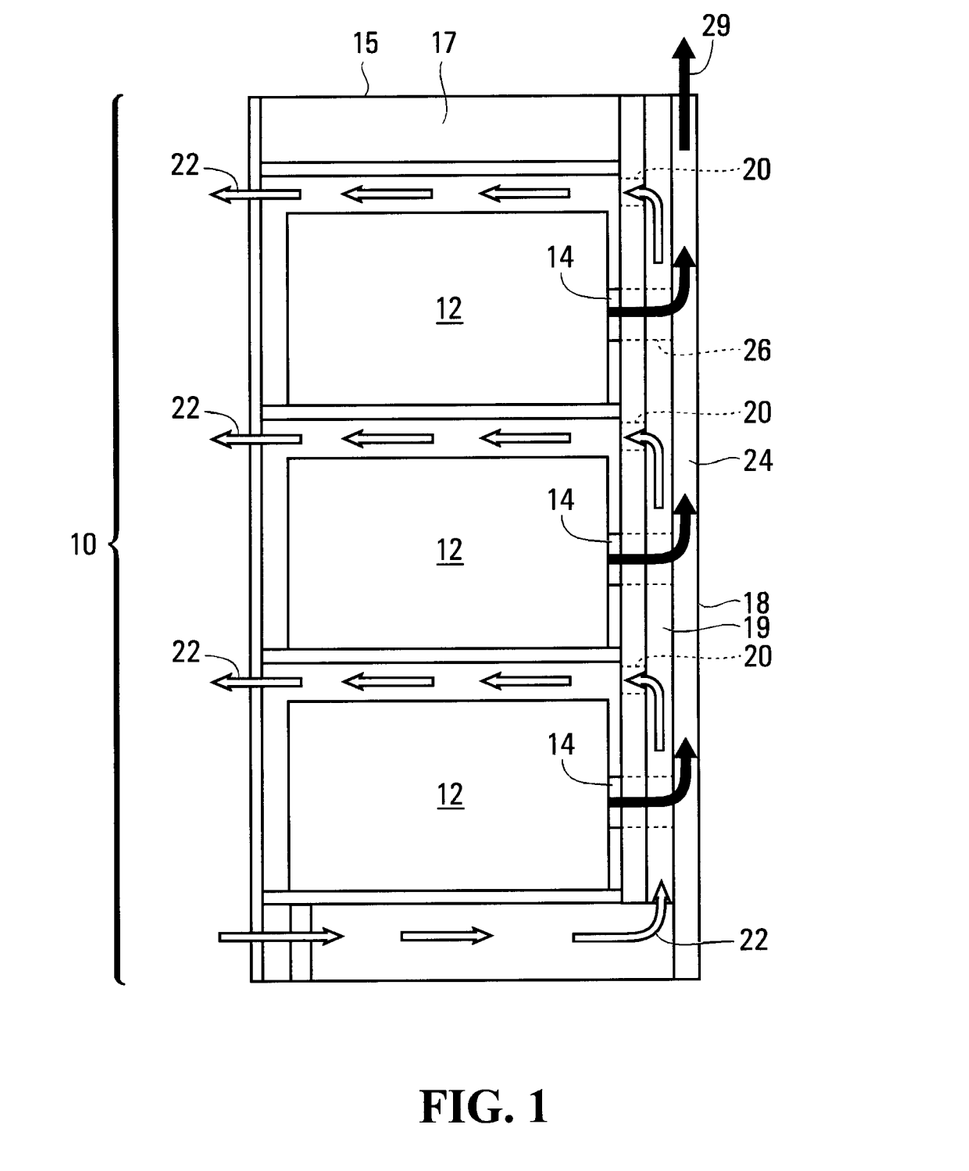
FIG. 1 is a schematic sectioned side view of a first embodiment of an apparatus for separating thermal runaway gases from cooling air in a battery system.
Figure 2A:
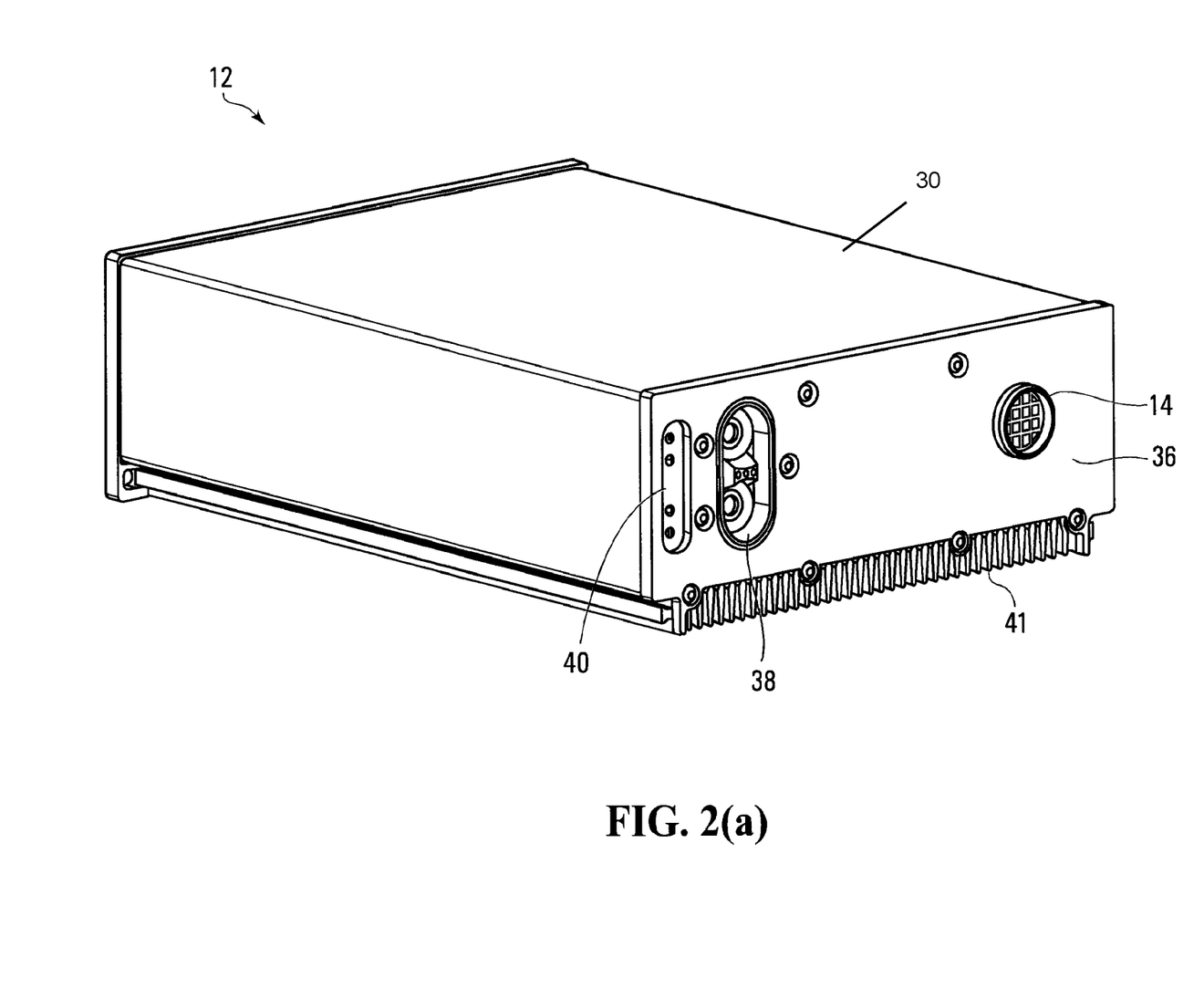
FIG. 2(a) is a rear perspective view of a battery module of the first embodiment of the apparatus.
Figure 2B:
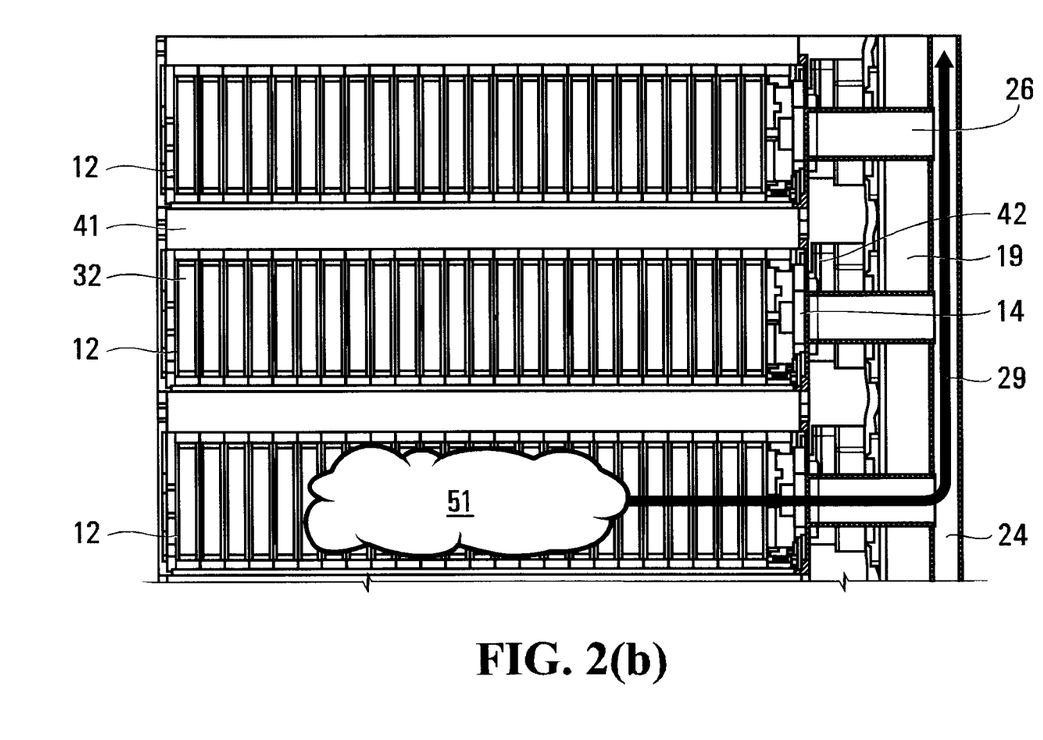
FIG. 2(b) is a sectioned side view of a portion of a rack assembly of the first embodiment of the apparatus, and a plurality of battery modules mounted in the rack assembly.

Referring particularly to FIGS. 2(a) and (b), each battery module 12 comprises an enclosure 30, a stack of lithium ion energy cells 32 (otherwise referred to as "battery cells"), and battery management system circuitry (not shown) communicative with the energy cells. The lithium ion energy cells 32 are known in the art, and for example, can be of the type typically used in marine vessels and grid power storage. The rear of the enclosure 30 is provided with an access panel 36 comprising the vent port 14, an external power connection port 38 and a signal connection port 40 for the battery management circuitry. The front, sides and the rear access panel of the enclosure 30 form a fluid-tight seal that is intended to direct any thermal runaway gases that may be formed during a thermal runaway event out through the vent port 14. The fluid tight seal can also provide an IP67 seal to prevent water from entering the enclosure; such a seal for example, enables the battery module in normal operation to be resistant to water from a water sprinkler or mist. The enclosure 30 can be made of a fire resistant material such as aluminum. The bottom surface of the enclosure comprises a heat exchanger 41 that is in thermal communication with the energy cells 32; the heat exchanger 41 comprises multiple heat exchange fins that extend along the length of the battery module enclosure 30.

A seal is provided at the vent port 14 to establish a fluid tight seal with a corresponding thermal runaway gas inlet 26 in the manifold 18. The manifold 18 is also provided with power and communication couplings 42 which electrically couple with the power and signal connection ports 38, 40 (see FIG. 4) when the battery module 12 is docked. The power and communication couplings 42 are connected to respective power and communication cables 49 that extend along the back of rack assembly (see FIG. 4), and are physically separated from the cooling air channel 19 and the thermal runaway gas channel 24.

Figure 3:
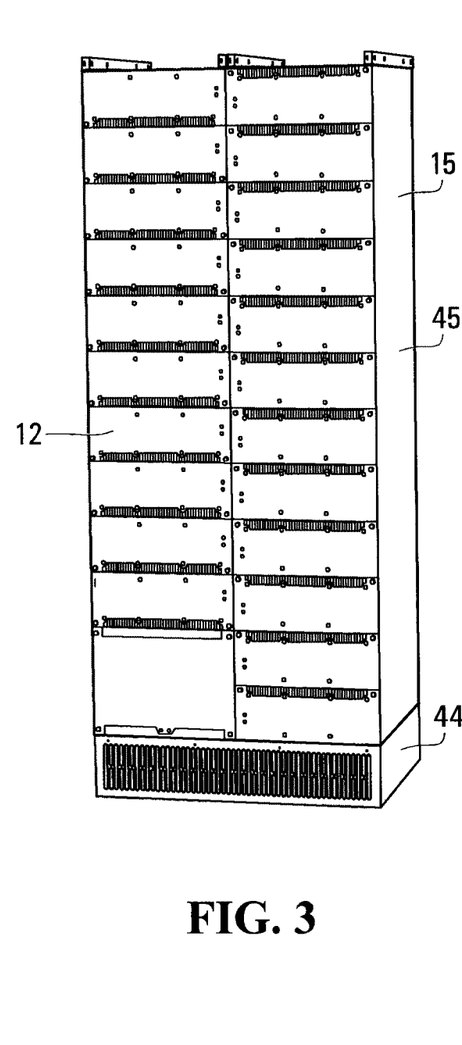
FIG. 3 is a perspective view of the rack assembly, with battery modules installed.
Figure 4:
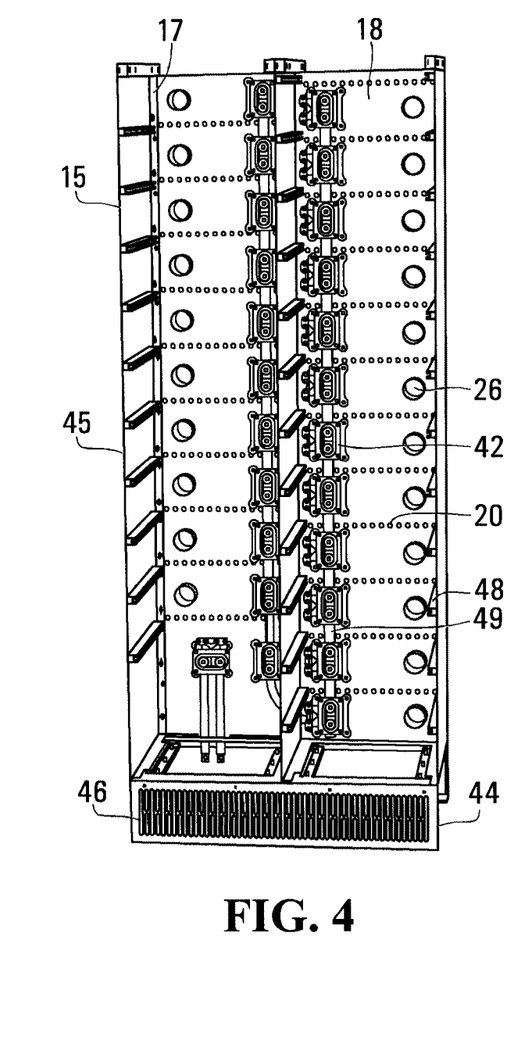
FIG. 4 is a perspective view the rack assembly with the battery modules removed.

Referring particularly to FIGS. 3 and 4, the rack assembly 15 has a frame 17 with a base 44 and left and right side walls 45 that cover the sides of the frame 17 and extend from the base 44 to the top of the frame 17. As previously noted, the manifold 18 serves as the back wall of the rack assembly 15, and the front of the rack assembly 15 is open to receive battery modules 12. The front of each battery module 12 has an opening communicative with the heat exchanger 41 and enable the heat exchanger fins to direct cooling air along the length of the module 12 and escape from the system out of the front of the rack assembly 12. An inlet 46 of the cooling air channel 19 is in the front of the base 44, and the cooling air channel 19 extends through the base 44 and upward through the manifold 18; the manifold also comprises horizontal rows of cooling air outlets 20 in fluid communication with the cooling air channel 19 and which are vertically spaced along the height of the manifold 18.

Horizontal shelves 48 for supporting the battery modules 12 extend inside the frame 17 and are vertically spaced to provide enough space to accommodate the battery modules 12 along with some vertical clearance between battery modules 12, which provide cooling air access to the bottom and top surfaces of the battery modules 12 mounted on the shelves. More particularly, the shelves 48 are positioned relative the cooling air outlets 20 such that the heat exchanger 41 of each battery module 12 is aligned with a row of cooling air outlets 20.

The manifold 18 further comprises the thermal runaway gas inlets 26, and the power and communication couplings 42 for the battery modules 12. The base, top plate and side walls of the rack assembly 15 form a substantially air tight enclosure such that substantially all of the cooling air directed into the rack assembly 15 from the cooling air outlets 20 exits the system via the openings at the front of the rack assembly 15.

In this embodiment the rack assembly 15 is designed to house two battery modules 12 per row thereby defining two columns of battery modules 12; an internal wall is provided between the two columns, with shelves spaced along the height of the internal wall. In alternative embodiments (not shown), each row can house a different number of battery modules; the number and position of the power and communication couplings and thermal runaway gas inlets 26 are adjusted accordingly.

The battery modules 12 are mounted inside the rack assembly 15 through the front of the rack assembly 15. The battery modules 12 slide along the shelves 48 until they make contact and dock with the rear manifold 18, wherein the power and communication couplings 42 and thermal runaway gas inlets 26 of the manifold 25 matingly engage with the respective external power connection ports 38, signal connection ports 40 and vent ports 14 of the battery modules 12. In particular, each thermal runaway gas inlet 26 and associated vent port 14 form a substantially fluid tight seal such that any thermal runaway gases discharged from the battery module 12 do not flow into the inside of the rack assembly 15 and mix with the cooling air therein.

The width of the frame 17 is selected so that there is a lateral space between each side of the battery module 12 and the respective frame side wall when the battery module 12 is mounted in the frame 17 and docked with the manifold 18; further, the height of each battery compartment is selected so that there is vertical space in between adjacent battery modules 12 when the battery modules 12 are mounted in the frame 17. These lateral and vertical spaces provide the cooling air path to flow over the surfaces of the battery modules 12 and their heat exchangers 41, thereby cooling the battery modules 12.

The system 10 can include flame arrestors (not shown) that are inserted in the thermal runaway gas pathway 29. For example, one flame arrestor is located in each thermal runaway gas inlet 26 in the manifold 18. Commercially available flame arrestors that are sufficient to arrest a flame exiting the battery module 12 can be used.

In operation and referring to FIG. 2(b), any thermal runaway gas 45 formed during a thermal runaway event will vent from one or more energy cells 32 and discharge from the battery module 12 containing the energy cells 32 through the vent port 14, through the thermal runaway gas inlet 26 of the manifold 18 and away from the system 10 along thermal runaway gas pathway 29. Because the thermal runaway gas pathway 29 and cooling air pathway 22 are physically separated, mixing of thermal runaway gas and cooling air is minimized thereby reducing the likelihood of an explosion. In other words, the manifold 18 acts as a separator and along with the structures of the battery module 12 and rack assembly 15 serve to physically separate the cooling air pathway 22 and the thermal runaway gas pathway 29.

Figure 5:
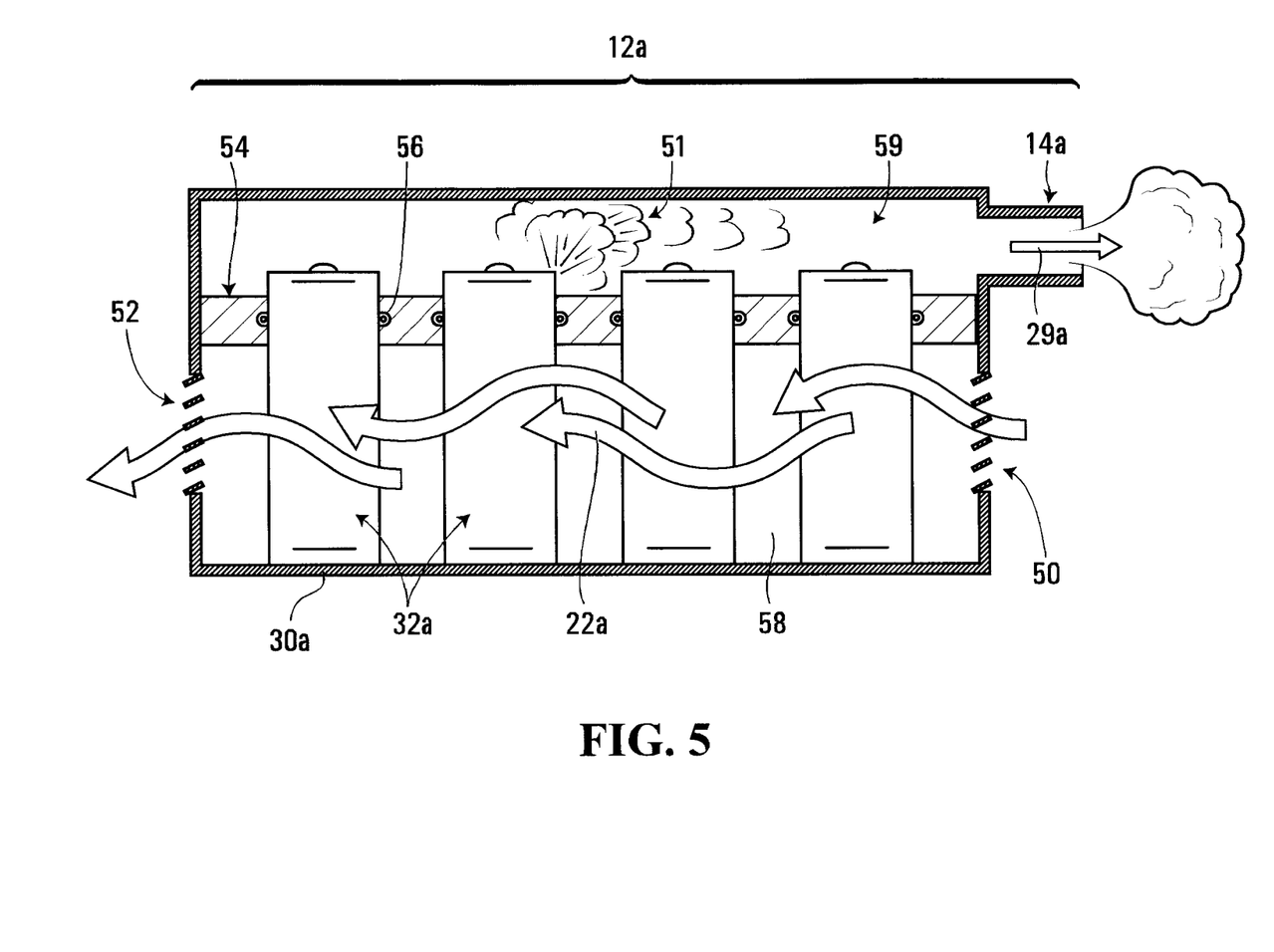
FIG. 5 is a schematic side sectioned view of a second embodiment of an apparatus for separating thermal runaway gases from cooling air in a battery system.

Instead of providing a system wherein cooling air flows across the outer surfaces of the battery modules, the system can be configured to flow cooling air through each battery module such that each energy cell in each module is directly cooled by the cooling air. Referring now to FIG. 5 and according to a second embodiment, the battery module 12a has a modified enclosure 30a to define a cooling air pathway 22a that extends through the battery module 12a and across each lithium ion energy cell 32a in the enclosure 30a. More particularly, the enclosure 30a is provided with a cooling air inlet 50 at a rear end of the enclosure 30a, and a cooling air outlet 52 at a front end of the enclosure 30a. The energy cells 32a can be a type that are commercially available and comprise a cylindrical body with an outer metal cladding and a top end with a vent designed to relieve internal pressure resulting from the production of gases. The energy cells 32a are mounted vertically in a laterally spaced arrangement inside the enclosure 30a such that a continuous air flow pathway 22a is defined between the cooling air inlet and outlet 50, 52.

A horizontal separator plate 54 is mounted inside the enclosure 30a and serves to divide the interior of the enclosure 30a into two chambers namely a cooling air chamber 58 comprising the cooling air pathway 22a, and a thermal runaway gas chamber 59 comprising a thermal runaway gas pathway 29a. The separator plate 54 is provided with openings to matingly receive each energy cell 32a such that a top end of each energy cell 32a extends into the thermal runaway gas chamber 59 and the rest of the energy cell 32a remains in the cooling air chamber 58 for direct cooling by cooling air flowing along the cooling air pathway 22a. Gaskets 56 are located at each separator plate opening to provide a gas-tight seal between the cooling air chamber 58 and the thermal runaway gas chamber 59. The rear end of the thermal runaway gas chamber 59 comprises a vent port 14a that can matingly couple with the thermal runaway gas inlet 26 of the manifold 18 in the same manner as in the first embodiment, or can directly vent out of the rear of the rack assembly (not shown). However the cooling air outlets 20 in the manifold 18 are modified to direct cooling air into the cooling air inlet 50 of the battery module enclosure 30a, e.g. by a duct coupling (not shown). Cooling air discharged from the cooling air outlet 52 will flow out the system from the front end of the rack assembly 15, in the same manner as the first embodiment.

In operation, any thermal runaway gas 51 formed during a thermal runaway event will discharge from the energy cell vent and into the thermal runaway gas chamber 59, and then move through the vent port 14a along the thermal runaway gas pathway 29a and away from the system 10. Because the thermal runaway gas pathway 29a and cooling air pathway 22a are physically separated by the separator plate 54 inside the battery module 12, mixing of thermal runaway gas and cooling air is minimized thereby reducing the likelihood of an explosion.

Figure 6:
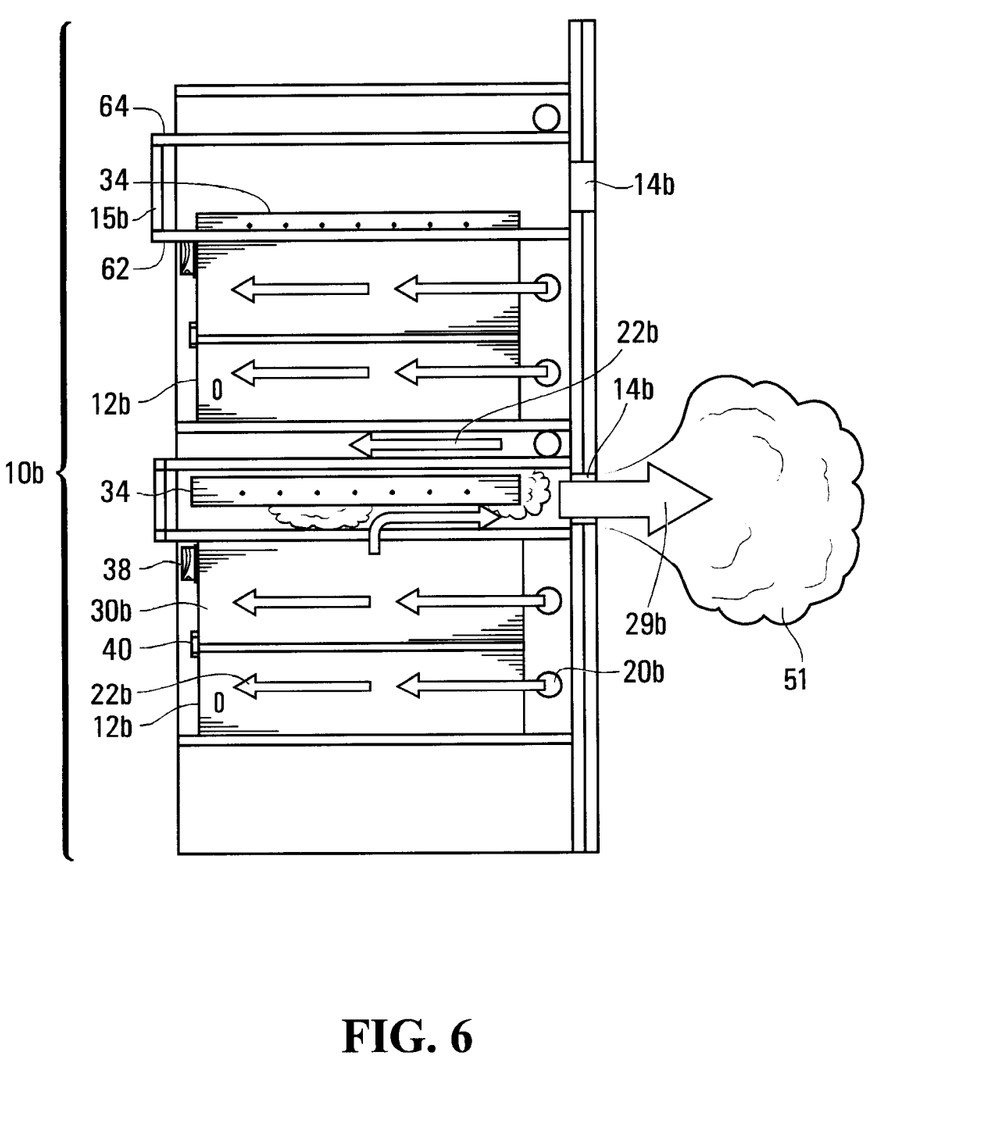
FIG. 6 is a schematic side sectioned view of a third embodiment of an apparatus for separating thermal runaway gases from cooling air in a battery system.
Figure 7A:
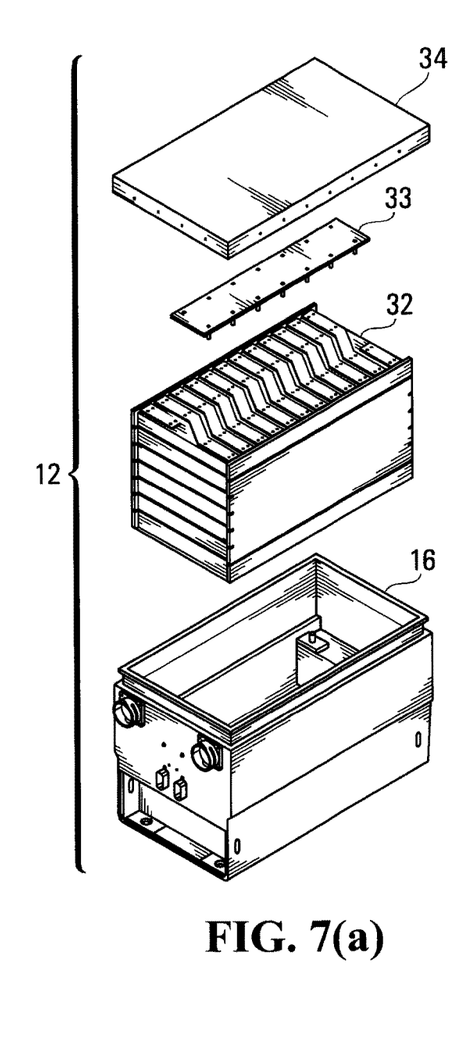
FIG. 7(a) to (c) are schematic exploded perspective, assembled perspective and assembled side elevation views of a battery module of the third embodiment of the apparatus.
Figure 7B:
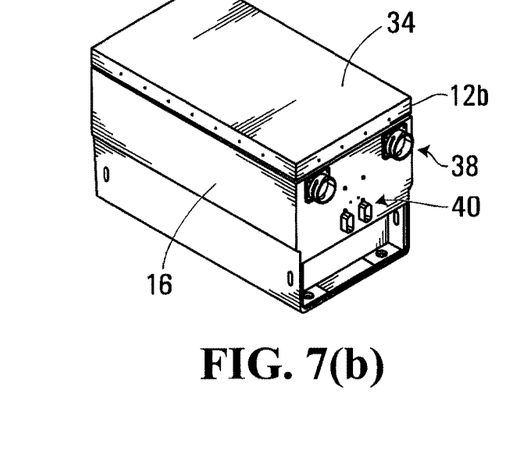
Figure 7C:
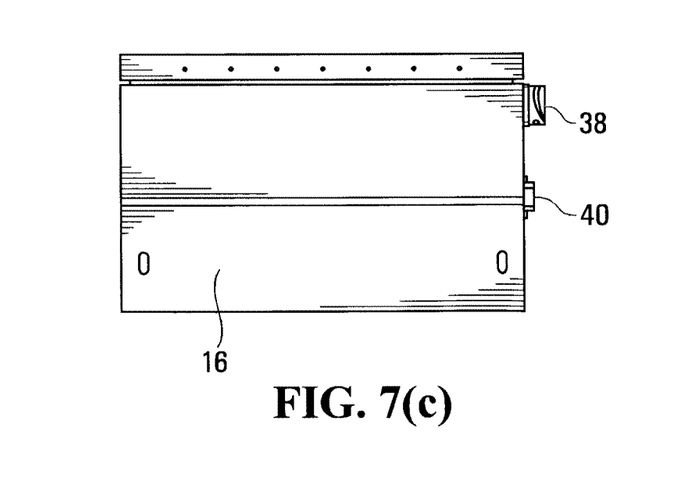

According to another embodiment and referring now to FIGS. 6 and 7, a battery system 10b can be provided having battery modules 12b with a removable lid 34 that provides a means for releasing pressure inside a battery module enclosure 30b caused formation of thermal runaway gases 51 therein. The system 10b comprises a rack assembly 15b that is modified from the first embodiment to include multiple thermal runaway gas chambers that are each in communication with a top end of a battery module 12b located in an adjacent battery compartment, and which serve to define a thermal runaway gas pathway 29b that is in gaseous communication with the battery module 12b but which is substantially physically separated from a cooling air pathway 22b in the battery compartment.

More particularly, the thermal runaway gas chamber comprises a horizontally extending lower separator plate 62 with an opening sized to matingly receive a battery module 12b such that a top end of the battery module 12b including its lid 34 extends into the thermal runaway gas chamber and the rest of the battery module 12b remains in the adjacent battery compartment below for receiving cooling air flowing along the cooling air pathway 22b. The cooling air flows into the space surrounding the battery modules 12 through cooling air outlets 20b in the side walls of the rack assembly 15b, across the battery modules 12b and out of the system through an opening in the front of the rack assembly 15b. The separator plate 62 serves to physically separate the thermal runaway gas pathway 29b from the cooling air pathway 22a thereby minimizing the likelihood of an explosion in the event of a thermal runaway event; gaskets (not shown) can be located at the lower separator plate opening to provide a gas-tight seal with the battery module 12b. The thermal runaway gas channel also includes a horizontally extending upper plate 64 that limits the vertical movement of the lid 34 as well as side, front and rear walls (not all shown in FIG. 6) that serve to provide a means for physically separating the thermal runaway gas pathway 29b from the cooling air pathway 22b. The thermal runaway gas pathway exits the thermal runaway gas chamber via a vent port 14b at the rear of the rack assembly 15b.

Referring now to FIG. 7, the battery module 12 comprises an enclosure base 16, a stack of lithium ion energy cells 32, battery management system circuitry 33 communicative with the energy cells 32, and the enclosure lid 34. A gasket (not shown) lines the inside surface of the lid 34 and ensures a fluid-tight seal when the lid 34 is mounted on the top of the base 16 ("closed position"). The lid 34 and base 16 are made of a fire resistant material such as aluminum. An external power connector 38 and signal connector 40 for the energy cells 32 is provided on one side of the enclosure base 16. The lid 34 comprises a rectangular horizontal section and four interconnected vertical sections that extend downwardly from the horizontal section. The base 16 is generally comprised of a rectangular floor and four interconnected side walls that extend upwardly from the floor to form a rectangular box with a top opening. The lithium ion energy cells 32 are mounted inside the base 16 in a manner known in the art; the dimensions of the base are selected so the cells 32 are located entirely inside the base with some room to spare.

In operation, a thermal runaway event results in the release of the flammable gases, which expand into the empty spaces within the battery enclosure causing the pressure inside the enclosure to increase. Once the internal pressure increases beyond a certain threshold, it causes the lid 34 to lift vertically off the rim. When this happens, the thermal runaway gases 51 leave the battery module 12 and enter into the thermal runaway gas chamber, flow along the thermal runaway gas pathway 29b, through the thermal runaway gas inlet 26b and away from the system 10b. In effect, the thermal runaway gas chamber serves as a separator to physically separate the thermal runaway gas pathway 29b from the cooling air pathway 22b such that mixing of thermal runaway gas and cooling air is minimized thereby reducing the likelihood of an explosion.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

The invention claimed is:

1. A system for managing thermal runaway in a battery, comprising:
   (a) at least one battery module comprising an enclosure housing at least one energy cell, the enclosure being fluidly sealed apart from a vent port configured to discharge thermal runaway gas vented from the at least one energy cell;
   (b) a rack assembly comprising a manifold and a frame with at least one shelf for mounting the at least one battery module;
   (c) a cooling air pathway in thermal communication with the at least one energy cell, the cooling air pathway extending between the frame and at least one outer surface of the at least one battery module when the at least one battery module is mounted on the shelf and docked with the rack assembly;
   (d) a thermal runaway gas pathway in gaseous communication with the at least one energy cell, wherein the manifold has a thermal runaway gas channel with a thermal runaway gas inlet in gaseous communication with the vent port such that the thermal runaway gas pathway extends from the vent port, through the thermal runaway gas inlet and into the thermal runaway gas channel; and
   (e) a separator that physically separates the cooling air pathway and the thermal runaway gas pathway such that cooling air flowing along the cooling air pathway does not substantially mix with thermal runaway gas venting from the at least one energy cell and flowing along the thermal runaway gas pathway.

2. The system as claimed in claim 1 wherein the manifold comprises a cooling air channel with at least one cooling air outlet in gaseous communication with the at least one outer surface of the at least one battery module, such that the cooling air pathway extends through the cooling air channel, through the at least one cooling air outlet and over the at least one outer surface of the at least one battery module.

3. The system as claimed in claim 2 further comprising a flame arrestor mounted in the thermal runaway gas pathway.

4. The system as claimed in claim 2 wherein the at least one battery module comprises an electrical power connection port and a signal connection port and the manifold further comprises a power coupling and a communication coupling that electrically communicate with the electrical power connection port and the signal connection port respectively when the at least one battery module is docked with the manifold.

5. The system as claimed in claim 1 wherein the enclosure has a base and a lid releasably mounted to an opening in the base, and the rack assembly comprises at least one thermal runaway gas chamber having an opening coupled to the opening of the base when the at least one battery module is docked in the rack assembly, and wherein the thermal runaway gas pathway extends inside the thermal runaway gas chamber and is physically separated by the thermal runaway gas chamber from the cooling air pathway which is in thermal communication with the base of the at least one battery module.

6. The system as claimed in claim 5 wherein the opening in the base is at the top of the enclosure and the thermal runaway gas chamber comprises a lower separator plate having an opening matingly receiving a top end of the base such that the lid is inside the thermal runaway gas chamber, and the rest of the base is outside of the thermal runaway gas chamber and at least part of which is in thermal communication with the cooling air pathway.

7. The system as claimed in claim 6 wherein the thermal runaway gas chamber comprises a thermal runaway gas outlet at a rear end of the rack assembly, and the rack assembly further comprises a cooling air outlet, and the cooling air pathway has an upstream end in fluid communication with the cooling air outlet and a downstream end in fluid communication with an opening at a front end of the rack assembly.

8. A method for managing thermal runaway in a battery system, comprising:
   (a) directing cooling air along a cooling air pathway in thermal communication with at least one energy cell in a battery module, the battery module comprising an enclosure housing the at least one energy cell, the enclosure being fluidly sealed apart from a vent port configured to discharge thermal runaway gas vented from the at least one energy cell; and (b) directing a thermal runaway gas formed during a thermal runaway event in the battery module away from the at least one energy cell and along a thermal runaway gas pathway that is physically separated from the cooling air pathway, such that the thermal runaway gas does not substantially mix with the cooling air, wherein the step of directing cooling air along a cooling air pathway comprises directing air into a rack assembly housing the battery module and flowing the cooling air across at least one outer surface of the battery module and out of a front end of the rack assembly; and wherein the step of directing the thermal runaway gas away from the at least one energy cell comprises flowing the thermal runaway gas through the vent port in the battery module and through a thermal runaway gas channel in a manifold of the rack assembly.

9. The method as claimed in claim 8 wherein the step of directing the thermal runaway gas away from the at least one energy cell comprises separating a battery module lid from a battery module base of the battery module then flowing the thermal runaway gas out of the battery module base into a thermal runaway gas chamber of the rack assembly, wherein at least the battery module lid is located in the thermal runaway gas chamber and at least a part of the battery module base is located outside of the thermal runaway gas chamber and in the cooling air pathway.

10. The method as claimed in claim 8 wherein the step of directing cooling air along a cooling air pathway comprises directing cooling air through a cooling air chamber in the battery module, wherein at least part of the at least one energy cell is located in the cooling air chamber.

11. The method as claimed in claim 10 wherein the step of directing the thermal runaway gas away from the at least one energy cell comprises directing the thermal runaway gas through a thermal runaway gas chamber in the battery module and out of a thermal runaway gas port in the battery module, wherein a part of the at least one energy cell having a gas vent is located in the thermal runaway gas chamber, and the thermal runaway gas chamber and the cooling air chamber are physically separated by a separator plate.

* * * * *